United States Patent
Yumoto et al.

(10) Patent No.: US 7,781,928 B2
(45) Date of Patent: Aug. 24, 2010

(54) BRUSHLESS MOTOR

(75) Inventors: Tohru Yumoto, Kiryu (JP); Masaki Ishizeki, Kiryu (JP); Hisashi Ishida, Maebashi (JP); Susumu Miyazaki, Niiza (JP); Kazushi Hamaya, Iruma-gun (JP); Yuichi Uebayashi, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/264,307

(22) Filed: Nov. 4, 2008

(65) Prior Publication Data
US 2009/0127953 A1 May 21, 2009

(30) Foreign Application Priority Data
Nov. 5, 2007 (JP) .............................. 2007-287860

(51) Int. Cl.
*H02K 5/00* (2006.01)
(52) U.S. Cl. .......................................... 310/89; 310/91
(58) Field of Classification Search .................. 310/89, 310/91
See application file for complete search history.

(56) References Cited

U.S. PATENT DOCUMENTS 2,406,947 A * 9/1946 Harlamoff .................. 415/111
5,514,922 A * 5/1996 Yabushita et al. ............. 310/45

FOREIGN PATENT DOCUMENTS

| JP | 07-245895 | | 9/1995 |
| JP | 3190511 | B2 | 5/2001 |
| JP | 2006-296033 | A | 10/2006 |

* cited by examiner

*Primary Examiner*—Guyen Leung
*Assistant Examiner*—Leda Pham
(74) *Attorney, Agent, or Firm*—Arent Fox LLP

(57) ABSTRACT

A brushless motor according to the present invention is provided with: a tubular stator case; a stator core fitted into the stator case; and a rotor rotatably supported via a bearing inside the stator core, wherein: an inner flange portion which extends radially inward is formed at a peripheral edge of an opening of one end of the stator case; and a bracket is fixed to the inner flange portion while contacting therewith so as to close the opening.

2 Claims, 6 Drawing Sheets

BRUSHLESS MOTOR

Priority is claimed on Japanese Patent Application No. 2007-287860, filed on Nov. 5, 2007, the contents of which are incorporated herein by reference.

BACKGROUND OF THE INVENTION

1. Field of the Invention

The present invention relates to an inner rotor type brushless motor which has, for example, a rotor and a stator.

2. Description of Related Art

Generally, an inner rotor type brushless motor has a stator core fitted into and fixed to a stator case and a rotor rotatably provided with respect to the stator core, and includes permanent magnets at an outer peripheral portion thereof. This stator core includes a plurality of teeth which project radially inward. A coil is wound around these teeth. As electric current flows into the coil, an attractive or repulsive force is generated between the rotor and the stator to rotate the rotor.

Among this kind of stator, there is one which includes a plurality of teeth fixed at the internal diameter side of a cylindrical yoke portion, and a coil bobbin coupling body in which a plurality of coil bobbins around which a coil is wound are coupled together, and in which this coil bobbin coupling body is mounted on the teeth (for example, refer to Japanese Patent No. 3190511). Further, there is one in which a dovetail groove is formed at an inner peripheral surface of a yoke portion formed in a tubular shape, and a split tooth including a projection fitted into the dovetail groove is mounted on a coil bobbin around which a coil is wound to form a split core, and is then fitted into the dovetail groove (for example, refer to Japanese Unexamined Patent Application, First Publication No. 2006-296033).

Winding starting end and winding finishing end of the coil wound around the coil bobbin are drawn out to the terminals, and are electrically connected with lead wires drawn in from the outside via the terminals.

In the above-mentioned brushless motor, the coil is the place to generate heat in the motor, and there is a problem in that the generated heat is not efficiently transferred, and remains in the motor. If the motor continues to work under the condition that the generated heat remains in the motor, it causes the overheating of the motor. Here, the generated heat by the coil is transferred through, for example, the teeth, the stator, and the stator case, and finally released to the out of the motor. In this case, a butting face between the stator case and the bracket is the narrowest and thermal resistance at the butting face is high, and the coil is not cooled effectively. Therefore, if the number of turns of the coil is increased, the heating value is also increased, and there is a problem in that the rated torque can not be improved.

Therefore, the present invention has been made in view of the above-described situations, and the object of the present invention is to provide a brushless motor capable of efficiently releasing the generated heat in the motor, and improving the rated torque.

SUMMARY OF THE INVENTION

In order to solve the above problem, the brushless motor according to the invention is provided with: a tubular stator case; a stator core fitted into the stator case; and a rotor rotatably supported via a bearing inside the stator core, wherein: an inner flange portion which extends radially inward is formed at a peripheral edge of an opening of one end of the stator case; and a bracket is fixed to the inner flange portion while contacting therewith so as to close the opening.

According to the above-described brushless motor, the inner flange portion which extends radially inward is formed in the opening at the other end of the stator case, the peripheral wall of the front bracket is thickly formed as the butting face, and the stator case and the front bracket are made to abut each other at the inner flange portion and the butting face. Thereby, the contact area between the stator case and the front bracket is increase. Accordingly, since the thermal resistance between the stator case and the front bracket can be reduced, the generated heat by the coil can be efficiently dissipated through the stator case and the front bracket from the stator core.

Accordingly, since the temperature rise of the coil can be suppressed, the number of turns of the coil can be increased, and the rated torque can be improved. Further, since the contact area between the stator case and the front bracket improves, the positioning of the stator core at the time of assembling becomes easy, it thereby is possible to improve working efficiency.

It may be arranged such that a peripheral wall which protrudes toward the stator case is thickly formed on the peripheral edge of the bracket; and the peripheral wall contacts with the inner flange portion.

In this case, since the thermal resistance between the stator case and the front bracket can be reduced by increasing in area of the butting face, the generated heat by the coil can be more efficiently dissipated through the stator case and the front bracket from the stator core.

DETAILED DESCRIPTION OF THE INVENTION

Next, an embodiment of the invention will be described with reference to the drawings. In the following description, the right side of FIG. 1 is defined as the other end side (front side), and the left side of FIG. 1 is defined as one end side (rear side).

Figure 1:
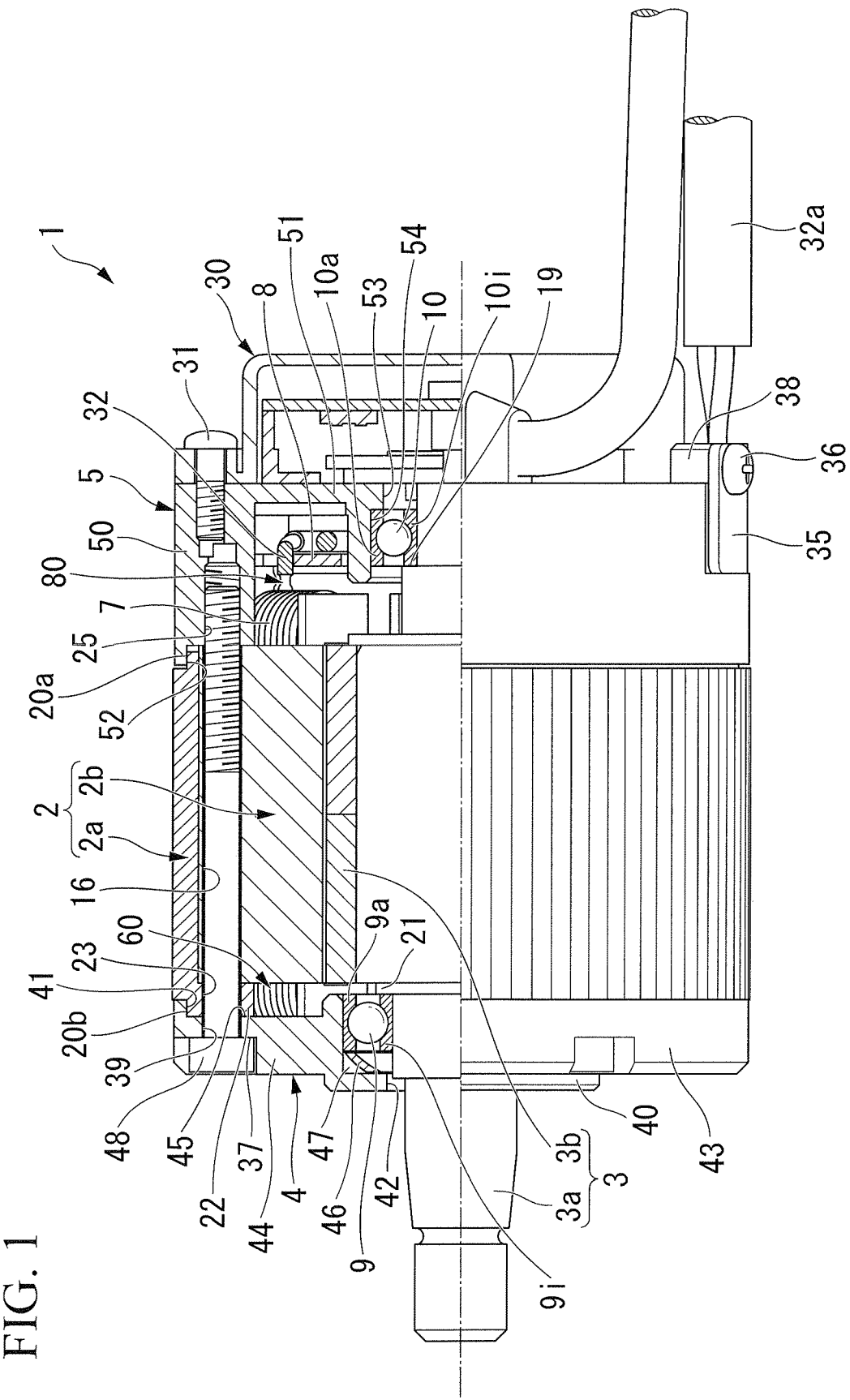
FIG. 1 is a partially sectional view of a brushless motor of an embodiment of the invention.
Figure 2:
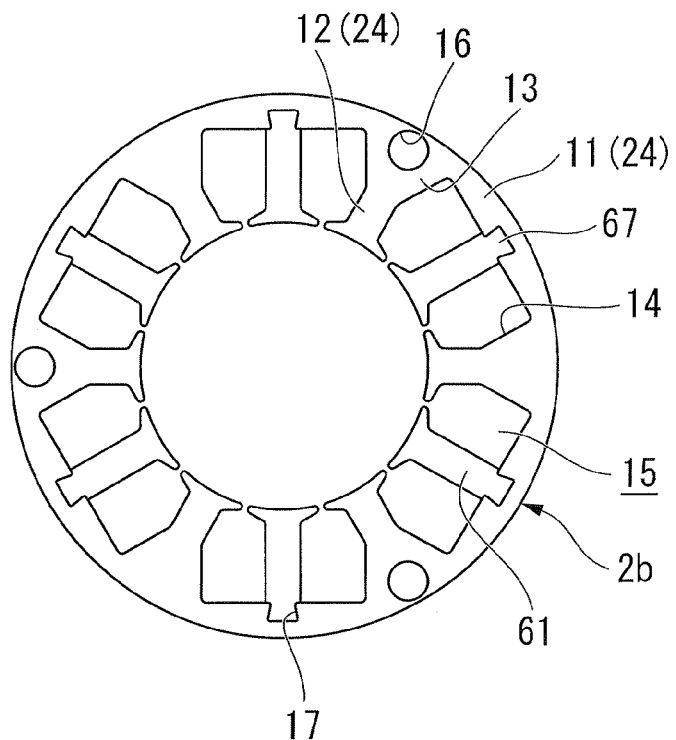
FIG. 2 is a plan view of a stator core.
Figure 3:
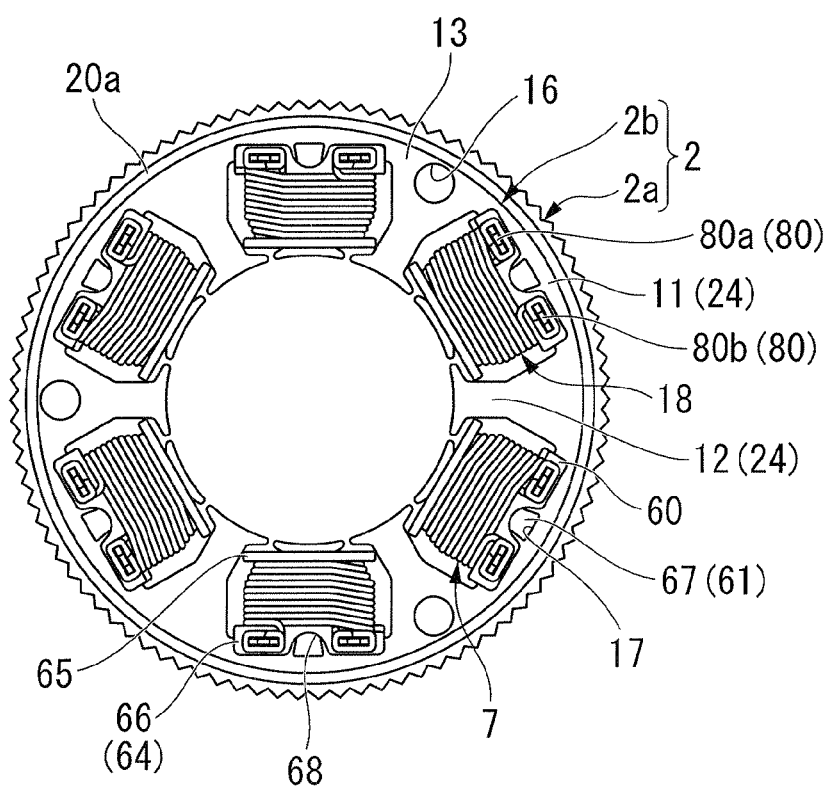
FIG. 3 is a plan view showing a stator case from the rear side.
Figure 4:
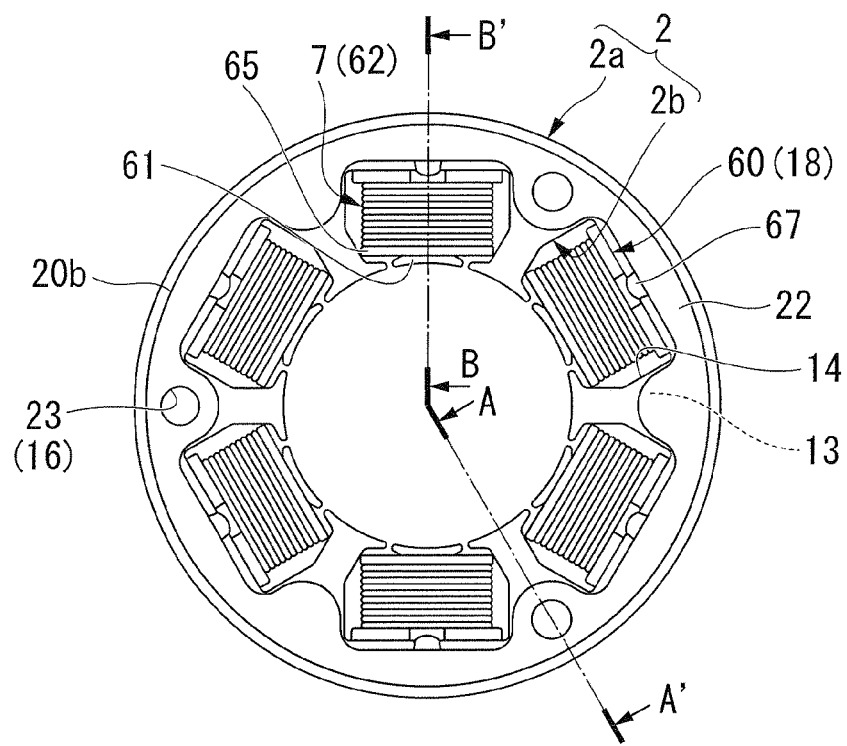
FIG. 4 is a plan view showing the stator case from the front side.

FIG. 1 is a partially sectional view taken along a line A-A' of FIG. 4. As shown in FIG. 1, a brushless motor 1 of this embodiment is an inner rotor type brushless motor 1, and includes a cylindrical stator 2, and a rotor 3 rotatably provided inside the stator 2.

As shown in FIGS. 2 to 6, the stator 2 includes a cylindrical stator case 2*a*, and a stator core 2*b* fitted into and fixed to the stator case 2*a*.

The stator core 2*b* is formed by laminating a magnetic sheet material axially or pressing magnetic metal powder, and includes a tubular yoke portion 11. At an inner peripheral surface of the yoke portion 11, six commutating-pole teeth 12 which extend radially inward are integrally formed at equal intervals in the peripheral direction of the yoke portion 11.

A root portion 13 of each of the commutating-pole teeth 12 is gradually enlarged to the yoke portion 11, and is formed in the shape of a fan, and each side face of the root portion 13 includes an inclined shoulder 14. The shoulders 14 of adjacent commutating-pole teeth 12 which face each other are formed so as to be parallel to each other, and a substantially rectangular slot 15 is formed between the adjacent commutating-pole teeth 12.

By forming the shoulders 14 of the adjacent commutating-pole teeth 12 which face each other so as to be parallel to each other in this way, the space of the slot 15 can be more largely secured. Also, three set bolt holes 16 are formed at regular intervals in the peripheral direction along the axial direction of the stator core 2b in the root portions 13 of the commutating-pole teeth 12.

Dovetail grooves 17 are formed along the axial direction of the yoke portion 11 at the inner peripheral surface of the yoke portion 11. Each of the dovetail grooves 17 is formed in an intermediate position of the adjacent commutating-pole teeth 12, and is formed so as to be open into the slot 15. A main core 24 is constituted by the yoke portion 11 and the commutating-pole teeth 12.

A split core 18 around which a coil 7 is wound is provided between the adjacent commutating-pole teeth 12. Six split cores 18 are provided at regular intervals in the peripheral direction of the yoke portion 11, and are arranged alternately with the commutating-pole teeth 12. In order to make the description more easily understood in FIG. 2, a coil bobbin 60 to be described later is omitted.

Figure 6:
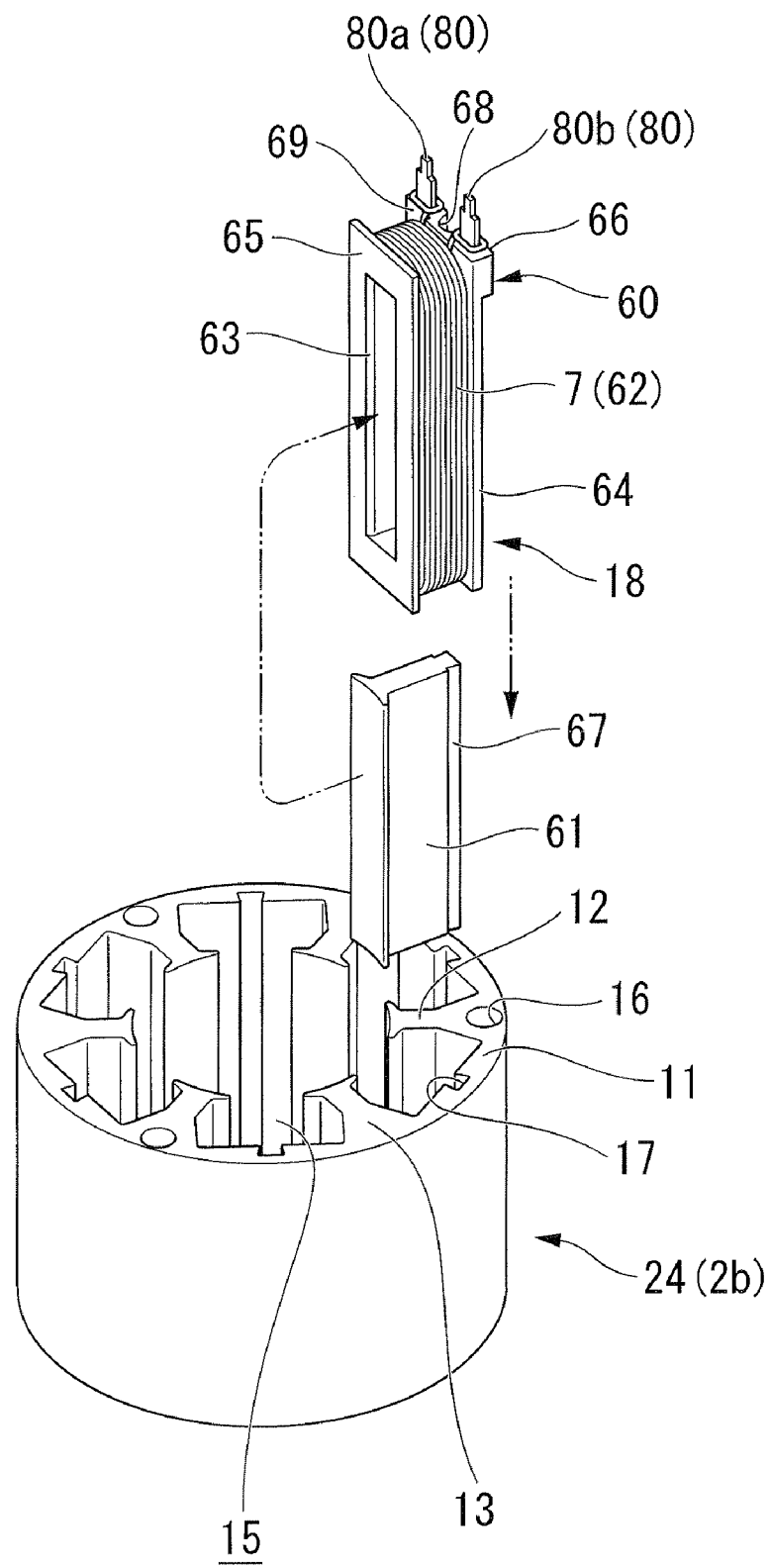
FIG. 6 is an exploded perspective view of the stator core.
Figure 7A:
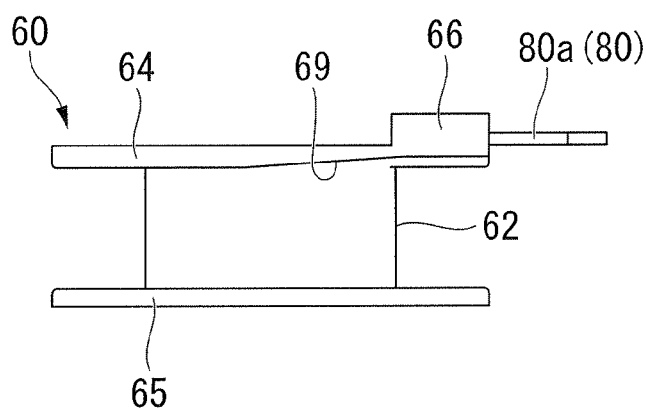
FIG. 7A is a left side view of a coil bobbin.
Figure 7B:
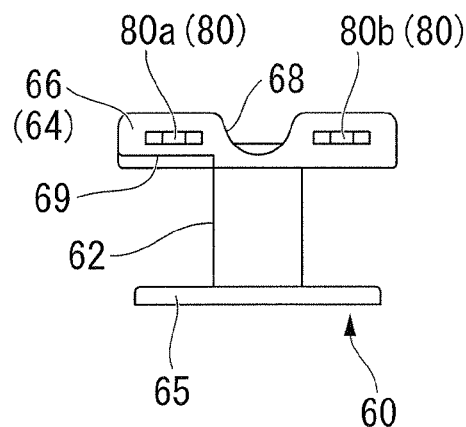
FIG. 7B is a plan view of a coil bobbin.
Figure 8:
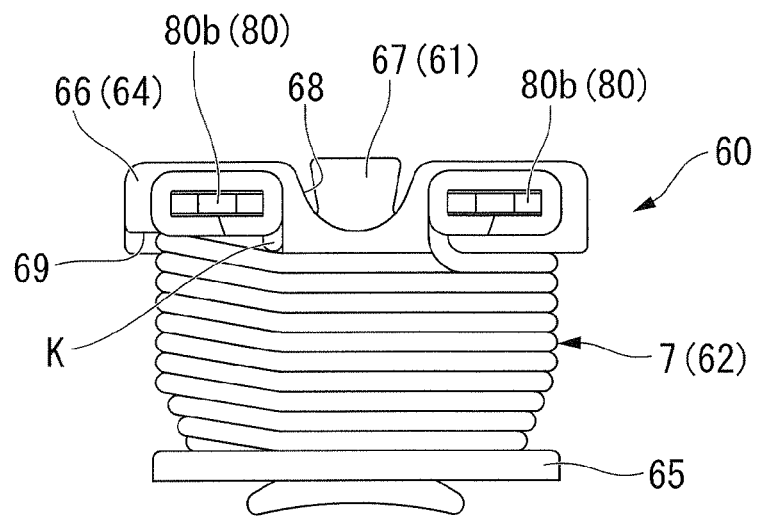
FIG. 8 is a plan view of a split core.

As shown in FIGS. 6 to 8, the above-described split core 18 includes the coil bobbin 60 around which the coil 7 is wound, and a split tooth 61 which is mounted on the coil bobbin 60. The split tooth 61 is a member which is T-shaped in plan view, and one end thereof is formed with a projection 67 which can fit into the dovetail groove 17 of the main core 24.

The coil bobbin 60 is made of a material having an insulating property, such as resin, and includes a rectangular tubular winding portion 62 (refer to FIG. 7) around which the coil 7 is wound. A central portion of the coil bobbin 60 is formed with a rectangular mounting hole 63 which passes through of the coil bobbin 60 in its width direction (the radial direction of the stator core 2b), and this central portion is mounted with the split tooth 61 (refer to FIG. 6).

Upper and lower ends of the winding portion 62 include an upper flange portion 64 and a lower flange portion 65 which extend outward from the peripheral edge thereof. One end side of the upper flange portion 64 of the coil bobbin 60 is formed as an enlarged portion 66, and the tip of the upper flange portion is provided with two terminals 80. One of the terminals 80 is a terminal 80a of a winding starting end of the coil 7, and the other of the terminals 80 is a terminal 80b of a winding finishing end of the coil 7, and the coil 7 wound around the coil bobbin 60 is connected to the terminals.

A clearance groove 68 which is semicircular in plan view is formed in the enlarged portion 66 of the coil bobbin 60 along the longitudinal direction of the coil bobbin 60. The clearance groove 68 is formed with almost the same width as the mounting hole 63 of the coil bobbin 60 between two terminals 80. That is, after the split tooth 61 is inserted through the mounting hole 63 of the coil bobbin 60, at least the projection 67 of the split tooth 61 is adapted to be capable of being visually seen over the enlarged portion 66 (refer to FIG. 8) in plan view.

An inclined portion 69 is formed at the terminal 80a of the winding starting end in a reverse face of the upper flange portion 64 of the coil bobbin 60. The inclined portion 69 is formed in the shape of a slope to a halfway portion of the upper flange portion 64 along the longitudinal direction from the tip of the enlarged portion 66. Specifically, the inclined portion is preferably inclined as much as the thickness of one turn of the coil 7.

As shown in FIG. 1, an opening at one end side of (rear side) of the stator case 2a is formed with a stepped portion 20a whose external diameter is reduced toward an outer peripheral edge, and a rear bracket 5 is provided so as to close an opening at the rear side. The rear bracket 5 is formed in the shape of a tube with a bottom formed of, for example, aluminum having a high heat transfer rate, and is constituted by a peripheral wall 50 and an end portion (end face) 51.

A stepped portion 52 corresponding to the stepped portion 20a of the stator case 2a is formed at the inner peripheral edge of the peripheral wall 50 of the rear bracket 5, and the stepped portion 52 is fitted onto and fixed to the stepped portion 20a of the stator case 2a. The axial center of the end portion 51 is formed with an insertion hole 53 for allowing one end of the rotor 3 to be inserted therethrough.

In the rotor 3, a substantially cylindrical magnet 3b is fitted onto and fixed to a shaft 3a having stepped portions 19 and 21 at both ends thereof. The magnet 3b is magnetized such that its pole may alternately change in the peripheral direction.

A bearing housing 54 is formed axially inside the insertion hole 53, and a bearing 10 which rotatably supports the shaft 3a is press-fitted into the bearing housing. The bearing 10 is press-fitted such that an end face at an outer ring 10a thereof is butted against the end portion 51 of the rear bracket 5, and is press-fitted such that an end face at an inner ring 10i thereof is butted against the stepped portion 19 at one end of the shaft 3a.

A substantially disc-like substrate 8 is provided at the outer peripheral side of the bearing housing 54. The substrate 8 supplies external power to the coil 7, is electrically connected with an external power source which is not shown via a plurality of lead wires 32, and a winding starting end and a winding finishing end of the coil 7 wound around the split core 18 are electrically connected via terminals 80 of the split core 18, to be described later. The lead wires 32 are drawn out along the axial direction, and are connected to an external power source via a draw-out hole (not shown) which is formed in a lower portion of the rear bracket 5. A fixing plate 35 is provided in the drawn-out lead wires 32 via a grommet 38, and is fastened and fixed by a pair of bolts 36 and 36. Reference numeral 32a in FIG. 1 is a coated tube which bundles and covers the lead wires 32.

Three set bolt holes 25 (to be described later) through which set bolts 48 are inserted are formed at regular intervals along the peripheral direction axially inside the rear bracket 5. Meanwhile, a cover 30 is fastened and fixed to the axial outside of the rear bracket 5 with bolts 31. The cover 30 closes the end of the rotor 3 at the rear bracket 5, and an optical encoder fixed to this end. The optical encoder detects the rotation angle of the rotor 3. A rotor position detecting method of the brushless motor 1 in this embodiment is not limited to the optical encoder, but may be carried out by a magnetic encoder, a resolver, a hall IC, and a sensor magnet, and may be carried out by sensor-less driving.

Figure 5:
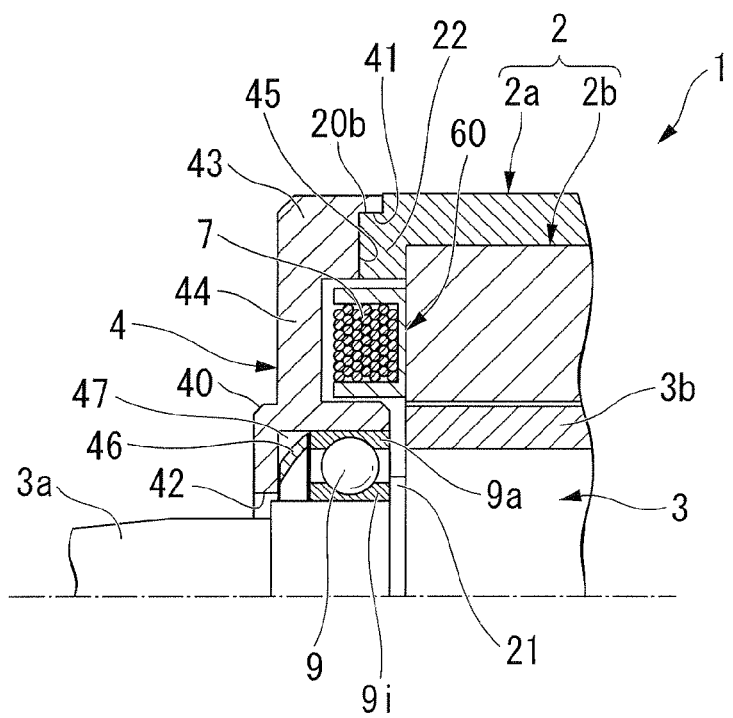
FIG. 5 is a partially sectional view taken along a line B-B' of FIG. 4.

Here, as shown in FIGS. 4 and 5, in the opening at the other end side (front side) of the stator case 2a, a stepped portion 20b whose external diameter is reduced toward the outer peripheral side similarly to one end side is formed and an inner flange portion 22 extended axially inward from the stepped portion 20b between the split cores 18 is formed. The inner flange portion 22 is formed so as to overlap the yoke portion 11 and the root portions 13 of the commutating-pole teeth 12, which are described above, and the reverse side thereof abuts on the stator core 2b. Further, set bolt holes 23 are formed in the inner flange portion 22 in correspondence with the set bolt holes 16 of the above-described stator core 2b.

A bearing 9 which rotatably supports the shaft 3a is provided at the other end side of the shaft 3a. The bearing 9 is press-fitted such that an end face at an inner ring 9i thereof is butted against the stepped portion 21 at the other end of the shaft 3a.

A front bracket 4 is provided at the other end side of the stator case 2a so as to close an opening at the front side. The front bracket 4 is formed in the shape of a tube with a bottom formed of, for example, aluminum having a high heat transfer rate, and is constituted by a peripheral wall 43 and a bottom plate 44.

The peripheral wall 43 of a front bracket 4 is thickly formed, and its end face is formed as a face 45 which butts against the inner flange portion 22 of the stator case 2a. Here, the butting face 45 is formed in the same shape as the width of the inner flange portion 22. A stepped portion 41 corresponding to the stepped portion 20b is formed at the outer peripheral side of the peripheral wall 43. As the stepped portion 41 is fitted onto the stepped portion 20b of the stator case 2a, the front bracket 4 is fixed such that the butting face 45 and the inner flange portion 22 are fixed so as to abut each other face to face.

A boss 40 is formed axially outward at the axial center of the front bracket 4. An insertion hole 42 for allowing the other end side of the shaft 3a to be inserted therethrough is formed at the axial center of the boss 40, and the axial inside of the insertion hole 42 is formed as a bearing housing 47 in which a wave washer 46 is received. Also, the other end side of the shaft 3a is inserted through the insertion hole 42 such that the bearing 9 press-fitted into the shaft 3a is received in the bearing housing 47 via the wave washer 46. The wave washer 46 presses an outer ring 9a of the bearing 9 to give a force in a thrust direction to the inner ring 9i via balls. Three stepped portions 37 (refer to FIGS. 1 and 9) which are cut out at the axial direction at regular intervals in the peripheral direction are formed at a peripheral edge of the front bracket 4, and set bolt holes 39 are formed in correspondence with the above-described set bolt holes 16 and 23.

As shown in FIG. 1, the front bracket 4 and the stator 2, and the rear bracket 5 are connected by inserting and fastening the set bolts 48 from the set bolt holes 39. Heads of the set bolts 48 are received in the stepped portions 37, and thereby become flush with the bottom plate 44 of the front bracket 4.

Here, a method of assembling the brushless motor 1 of this embodiment will be described.

First, as shown in FIG. 8, the coil 7 is wound around the coil bobbin 60. Specifically, the coil 7 is connected to the terminal 80a of the winding starting end, and is wound around the winding portion 62. Here, the coil 7 drawn from around the terminal 80a is different from the coil 7 wound around the winding portion 62 in directivity (refer to K in FIG. 8). However, by allowing one turn of the coil 7 drawn from around the terminal 80a to escape to the inclined portion 69, overlapping coils 7 can be easily loaded without interfering with each other.

Figure 9:
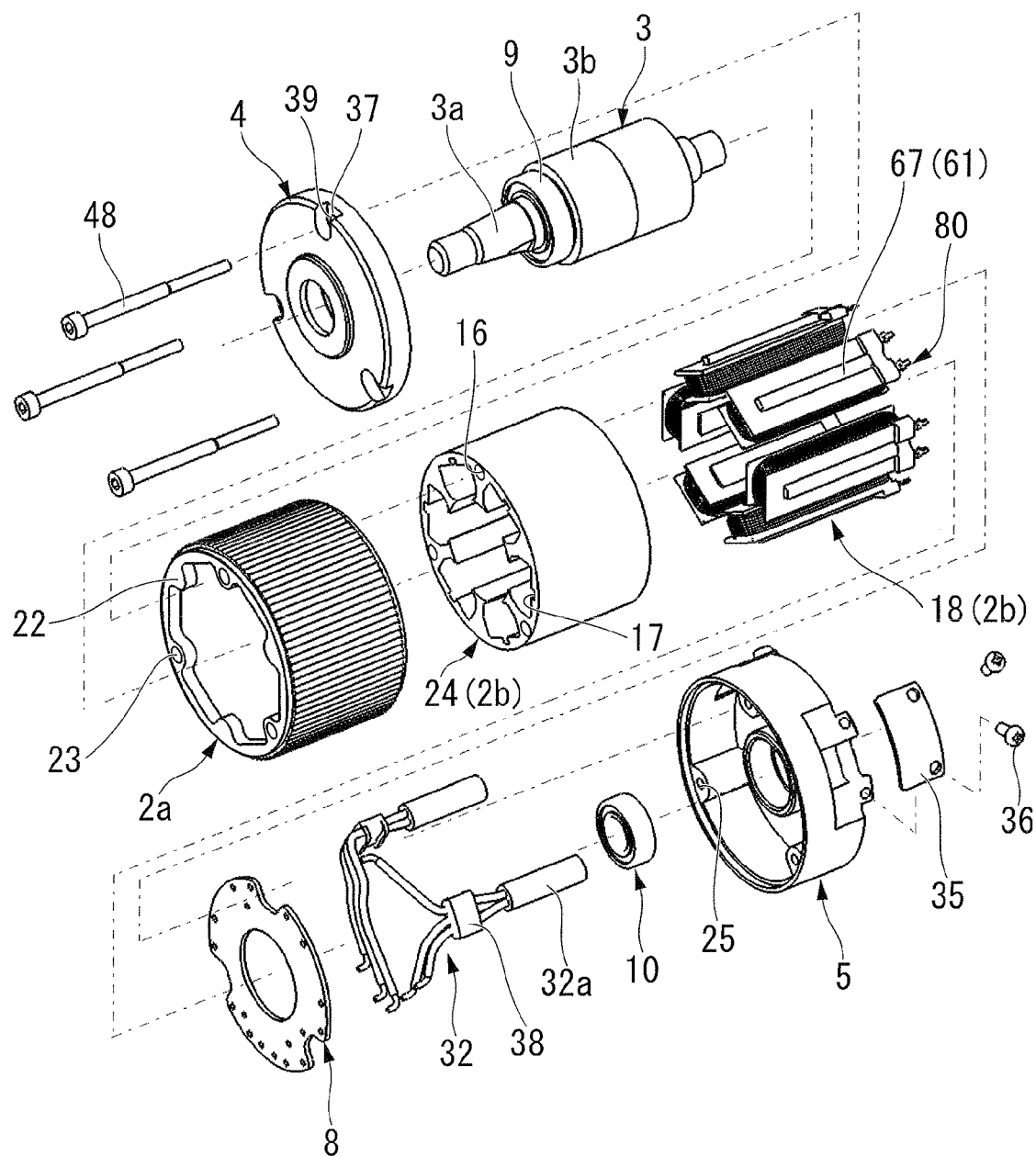
FIG. 9 is an exploded perspective view of a brushless motor.

Next, as shown in FIGS. 6 and 9, the mounting hole 63 of the coil bobbin 60 is mounted with the split tooth 61, and the projection 67 of the split tooth 61 and the dovetail groove 17 of the main core 24 are made to fit to each other. Then, when the split core 18 is pushed into the dovetail groove 17, the stator core 2b is assembled by pressing the projection 67 of the split tooth 61 by a pin through the clearance groove 68 formed in the coil bobbin 60. The stator core 2b is fitted into and fixed to the stator case 2a.

Next, the terminals 80 and the lead wires 32 are connected via the substrate 8 at one end side (rear side) of the stator case 2a, and the rear bracket 5 is closed by the press-fitted bearing 10. Then, after the lead wires 32 are drawn out of the draw-out hole of the rear bracket 5, the fixing plate 35 is fastened and fixed via the grommet 38 by the bolts 36.

Meanwhile, the bearing 9 is press-fitted from the other end side of the shaft 3a of the rotor 3 in which the magnet 3b has been magnetized in advance. At this time, the bearing 9 is press-fitted such that its portion at the inner ring 9i is butted against the stepped portion 21 of the shaft 3a. Then, the rotor 3 is inserted from the other end side (front side) of the stator case 2a, and is press-fitted until the stepped portion 19 of the shaft 3a is butted against the inner ring 10i of the bearing 10 press-fitted into the bearing housing 54 of the rear bracket 5.

Next, the opening at the other end of the stator case 2a is closed by the front bracket 4. At this time, the bearing 9 is set in a state where the wave washer 46 is received in the bearing housing 47, and the outer ring 9a of the bearing 9 is pressed by the wave washer 46. Along with this, the inner flange portion 22 of the stator case 2a is made to abut on the butting face 45 (refer to FIG. 5) of the front bracket 4 face to face.

Then, the front bracket 4 and the stator 2, and the rear bracket 5 are connected by inserting and fastening the set bolts 48 through the set bolt holes 16, 23, 25, and 39.

Here, if the fastening operation is completed by the set bolts 48, the inside of the brushless motor 1 is pressurized. Specifically, the wave washer 46 is made to abut on the outer ring 9a of the bearing 9. Thereby, the pressure of the wave washer is transmitted to the inner ring 9i of the bearing 9 via the balls, eliminating rattling caused by an inner clearance between the inner and outer rings 9i and 9a, and is transmitted from the inner ring 9i of the bearing 9 toward the inner ring 10i of the bearing 10 via the shaft 3a of the rotor 3, eliminating rattling caused by an internal clearance between the inner and outer rings 10i and 10a of the bearing 10. Then, since all the inner and outer rings 9i, 9a, 10i, and 10a of the bearings 9 and 10 are press-fitted and fixed, it is not necessary to fix the bearings with set screws, etc., it is possible to reduce the number of parts, and moreover, and it is possible to set the internal clearance of each of the bearings 9 and 10 to zero. Moreover, it is possible to make the brushless motor 1 small and lightweight, and it is possible to suppress the vibration or noise during the operation of the brushless motor 1.

Accordingly, according to the above-described embodiment, the inner flange portion 22 which extends radially inward is formed in the opening at the other end of the stator case 2a, the peripheral wall 43 of the front bracket 4 is thickly formed as the butting face 45, and the stator case 2a and the front bracket 4 are made to abut each other at the inner flange portion 22 and the butting face 45. This can improve the contact area between the stator case 2a and the front bracket 4. Also, since this can reduce the thermal resistance between the stator case 2a and the front bracket 4, the heat generated heat by the coil 7 can be efficiently dissipated through the stator case 2a and the front bracket 4 from the stator core 2b.

Accordingly, since the temperature rise of the coil 7 can be suppressed, the number of turns of the coil 7 can be increased, and the rated torque can be improved. Further, since the contact area between the stator case 2a and the front bracket 4 improves, the positioning of the stator core 2b at the time of assembling becomes easy, thereby making it possible to improve working efficiency.

Further, coils 7 having different directivity are prevented from overlapping and interfering with each other by allowing a winding starting end of the coil 7 drawn from around the terminal 80a of a winding starting end to escape to the inclined portion 69 formed in the coil bobbin 60. That is, the coil bobbin 60 itself is not made large, and disordered winding of the coil 7 can be prevented by easy working of only inclining the upper flange portion 64 of the coil bobbin 60 in the shape having a slope. Therefore, it is possible to make the brushless motor 1 to be small, and it is also possible to improve the occupancy of a coil 7 inexpensively. Also, since there is no disordered winding during the winding operation of the coil 7, an assembling operation can be performed easily.

Since the enlarged portion 66 of the coil bobbin 60 is formed with the clearance groove 68, when the coil bobbin 60 has been mounted on the split tooth 61, the projection 67 of the split tooth 61 projects in plan view. Therefore, when the projection 67 of split tooth 61 is made to fit to the dovetail groove 17 of the main core 24, the split tooth 161 (refer to FIG. 10) is not pressed over the coil bobbin 160 (refer to FIG. 10) unlike the related art, and the split tooth 61 can be directly pressed through the clearance groove 68. Accordingly, compared with a case where the split core 18 is pressed over the coil bobbin 60 made of resin, etc., the split core 18 can be made to fit to the main core 24 without damaging the coil bobbin 60.

The root portion 13 of each of the commutating-pole teeth 12 in the main core 24 spreads in the shape of a fan, and includes the inclined shoulder 14. Therefore, the wall thickness of the yoke portion 11 can be made small while a magnetic path width corresponding to a magnetic flux generated from the coil 7 can be sufficiently secured and the space for forming the set bolt holes 23 of the set bolts 48 can be secured.

That is, the space of the slot 15 formed between the adjacent commutating-pole teeth 12 can be largely secured by making the wall thickness of the yoke portion 11 small. Therefore, the cross-sectional area of the coil 7 can be increased without enlarging the brushless motor 1 itself or without complicating the winding of the coil 7.

For example, the high output of the brushless motor 1 can be achieved, and even in a case where the set bolts 48 with a large diameter are used when the brushless motor 1 with a long axial length is manufactured, the space for forming the set bolt holes 16 can be sufficiently secured in the root portions 13 of the main core 24. Therefore, it is possible to manufacture a high-output brushless motor 1 without enlarging the brushless motor 1 in the radial direction.

It should be understood that the invention is not limited to the above-described embodiment, but various modifications may be made to the above-described embodiment without departing from the spirit of the invention.

For example, in this embodiment, an inner flange portion of a stator case is formed in the opening at the front side of the stator case. However, the inner flange portion of a stator case may be formed in the opening at the reverse side of the stator case.

The set bolt holes may be formed in the shape of a U-shaped groove. Further, bolt holes for attaching a brushless motor between the set bolt holes may be formed at the root portions of the commutating-pole teeth.

While preferred embodiments of the invention have been described and illustrated above it should be understood that these are exemplary of the invention and are not to be considered as limiting. Additions, omissions and substitutions, and other modifications can be made without departing from the spirit or scope of the present invention. Accordingly, the invention is not to be considered as being limited by the foregoing description, and is only limited by the scope of the appended claims.

What is claimed is:

1. A brushless motor comprising:
   a tubular stator case;
   a stator core fitted into the stator case; and
   a rotor rotatably supported via a bearing inside the stator core, wherein:
   an inner flange portion which extends radially inward is formed at a peripheral edge of an opening of one end of the stator case; and
   a bracket abuts against the inner flange portion at an abutting face to close the opening;
   wherein the abutting face of the bracket is configured to have a same shape as a width of the inner flange; and
   wherein a coil bobbin of the stator core has a winding portion around which a coil is wound, the coil bobbin positioned between the abutting face and the bearing.

2. The brushless motor according to claim 1, wherein a peripheral wall which protrudes toward the stator case is thickly formed on the peripheral edge of the bracket; and the peripheral wall contacts the inner flange portion.

* * * * *